United States Patent [19]
Heintzelman

[11] 3,991,855
[45] Nov. 16, 1976

[54] AUTOMATIC GREASER FOR UNIVERSAL JOINT

[76] Inventor: Leo A. Heintzelman, 4990 Burlingame Ave., Wyoming, Kent County, Mich. 49509

[22] Filed: Jan. 20, 1975

[21] Appl. No.: 542,495

[52] U.S. Cl. .............................. 184/12; 64/17 A; 184/7 R
[51] Int. Cl.² ............................................ F16N 13/22
[58] Field of Search .................. 184/7, 12, 61, 6; 64/17 R, 17 A, 36 LB; 123/139 AL

[56] References Cited
UNITED STATES PATENTS

| | | | |
|---|---|---|---|
| 3,091,948 | 6/1963 | Zeller | 64/17 A |
| 3,353,374 | 11/1967 | Buthenhoff | 64/17 A |
| 3,645,115 | 2/1972 | Shotwell | 64/17 A |
| 3,740,969 | 6/1973 | Shotter | 64/17 A |
| 3,785,460 | 1/1974 | Smith | 64/17 A |

Primary Examiner—Richard C. Pinkham
Assistant Examiner—Marvin Siskind
Attorney, Agent, or Firm—Gordon W. Hueschen

[57] ABSTRACT

A system for lubricating flexible clutches and couplings while they are in motion. There are two shafts provided, one that is driving and another that is driven, connected to one-another by means of a flexible clutch which may be formed from two forked arms held flexibly to one another by means of small stud shafts. These shafts, in the process of operation, have a way to become wornout, and it is rather important that lubricating grease may be delivered to them to decrease friction. Grease is delivered to a stationary housing within which is rotatably mounted a circular disk. The disk is connected to the drive shaft and to the driven shaft. Grease passes from the housing into the disk and is then conducted to the bearing points of the clutch.

3 Claims, 5 Drawing Figures

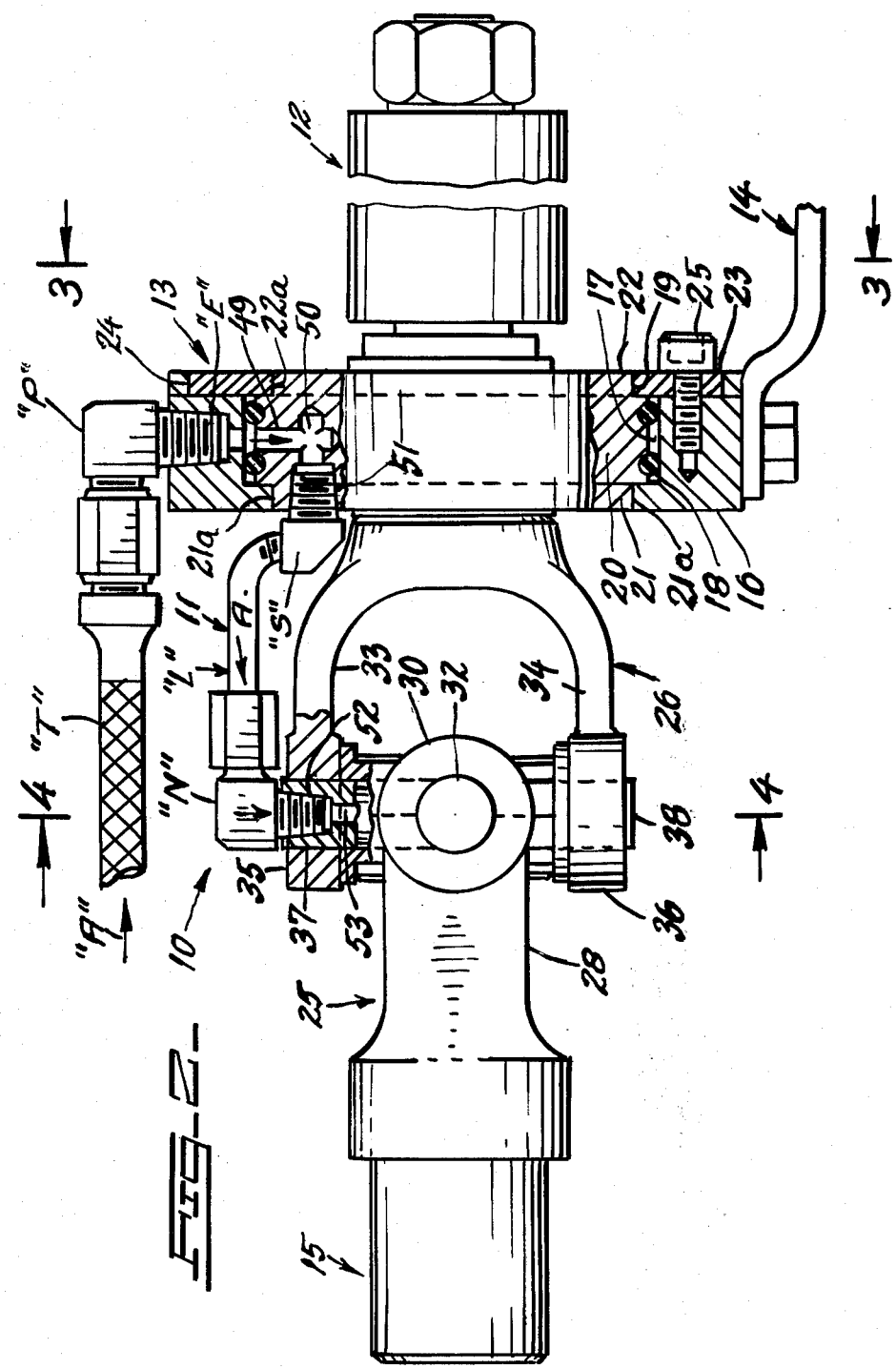

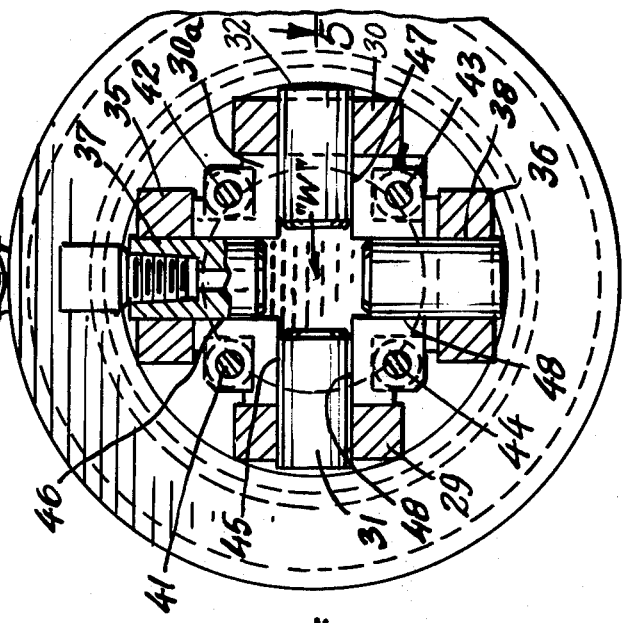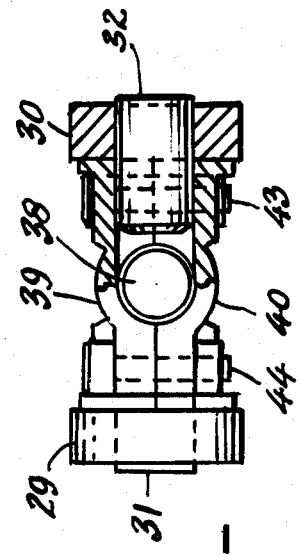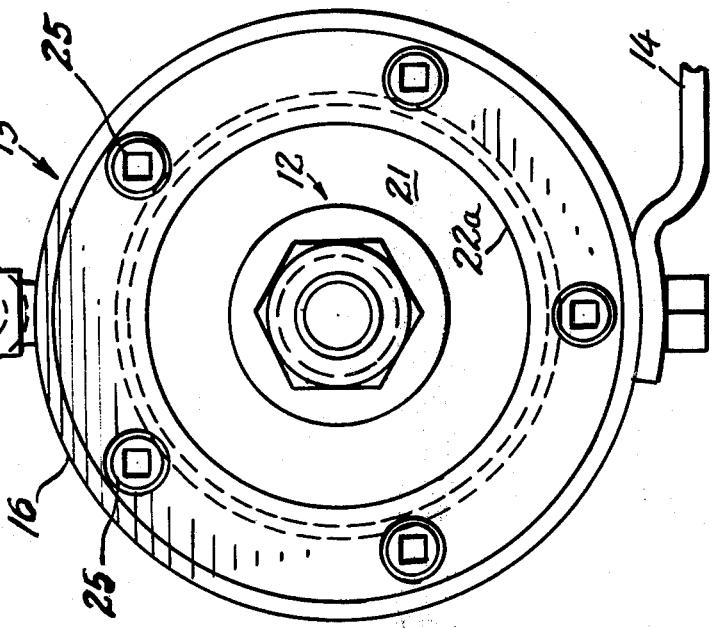

AUTOMATIC GREASER FOR UNIVERSAL JOINT

The present invention relates to clutch operated devices and more particularly to flexible clutches which may be readily supplied with lubrication oil during the process of machine operation. This is not an easy task because a flexible clutch, by its very manner of operation, as it flexes, permits not an easy access to its operational part and the use of lubricating grease.

To solve the aforesaid problem, the embodiment of the present invention provides for the utilization of a stationary manifold which may be secured to the chassis of the machine (such as farm tractor, a conveyor, etc) which may serve as the reservoir of the lubricating grease from a grease supply. From the stationary reservoir by means of a length of piping the grease may be delivered directly to the flexing forks of the flexible clutch. To facilitate the delivery of lubricant grease from the stationary manifold to the rotating clutch there is provided a rotating disk member which is properly sealed against leakage. The driving shaft of the machine is secured to one side of the disk member with the shaft of the flexible clutch secured to the other side thereof. The disk member rides within the stationary manifold which has a circular hole into which the disk member fits snuggly. The lubricating grease delivered from the reservoir (by proper channel connections) is then delivered to the aforesaid piping and from there it enters into the clutch proper. Stuffing rings are provided to prevent leakage of lubricant from the reservoir and the rotating disk member. The above referred to concise description of the embodiment of the present invention will be later described in greater detail.

From the above it is obvious that one object of the present invention is to provide a lubricating means of the class described for flexible clutches which is easy and inexpensive to manufacture, to install, and which will be leakproof.

Another object of the present invention is to provide a means for lubricating a universal joint from a stationary position as the flexible clutch rotates.

Still another object of this invention is to provide a flexible clutch with a rotating disk member which will serve as a scoop for lubricant, and may permit the lubricant to reach the clutch from the reservoir.

Still another object of this invention is to provide a means for preventing leakage of lubricant grease as it is delivered from the reservoir to the flexing clutch.

This invention also contains certain other features of construction and the combination and arrangement of several parts to be hereinafter fully described, illustrated in the accompanying drawings, and in the specification, and specifically pointed out in the appended claims.

In describing the invention in detail, references will be made to the accompanying drawings where like character numerals denote like or corresponding parts throughout the several views in which:

FIG. 2 is a partial cross-sectional view through the flexible clutch showing pertinent details of construction, and the channels delivering the lubricant from the stationary manifold to the flexible clutch;

FIG. 3 is a front elevational view of the present invention taken on the line 3—3 of FIG. 2.

FIG. 4 is a section taken on the line 4—4 of FIG. 2 showing pertinent details of the flexible clutch and the manner in which the lubricant reaches it from the reservoir; and FIG. 5 is a section taken on the line 5—5 of FIG. 4, showing the manner of construction of the flexible clutch.

Figure 1:
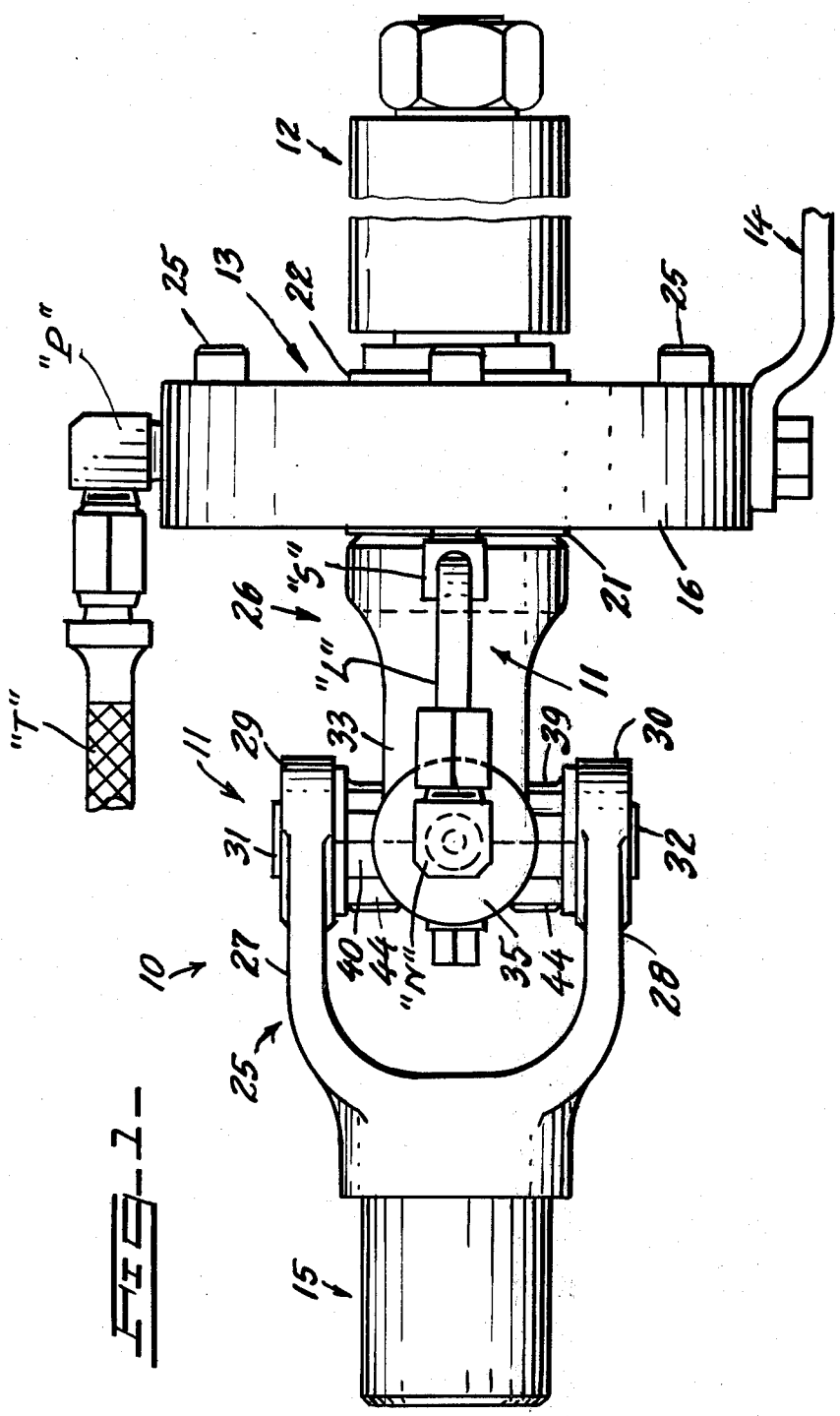
FIG. 1 is a plan elevational view of the lubricating means forming the embodiment of the present invention.

Referring now more particularly to FIG. 1, which shows best the embodiment of my invention, index numeral 10 indicates the general configuration of the flexible clutch and the means for lubricating same, which, in combination, comprises, the flexible clutch 11, driven by the machine (not shown, although it may be also the driving shaft), the driven shaft 12, the lubricant reservoir 13, and the bracket 14 by means of which the reservoir 13 is held to the chassis of the engine or machine (not shown). The clutch 11 has a machine shaft extension 15.

Referring more particularly to the clutch 11, it may be discerned that in the main it consists from two separate fork-shaped members 25 and 26, respectively. The member 25 has a shaft extension 15 on one end thereof, while at the other end it forms the two fingers 27 and 28 of the fork 25. The fingers 27 and 28 of the fork 25 end into a pair of stud shaft supports 29 and 30, each carrying the stud shaft 31 and 32 respectively. The shafts 31 and 32 are held tight in the supports 29 and 30, and do not rotate.

In like manner, referring to the forked member 26 (better seen in FIG. 2) it comprises the pair of fingers 33 and 34 of the fork 26, each ending with the stud shaft supports 29 and 30. The stud shaft support 35 holds short shaft 37, while the stud shaft support 36 holds a short stud shaft 38. Both stud shafts 37 and 38 are held tight within holes provided in the stud shaft supports 35 and 36.

In addition to the pair of forked U-shaped members 25 and 26, the flexible clutch 10 also contains a pair of clutch plates 39 and 40 (better seen in FIG. 5). In FIG. 4 it may be discerned that the plates 39 and 40 are substantially square in configuration. FIG. 4 shows the clutch plate 39 with the clutch plate 40 removed to expose the position of the short stud shafts 31 and 32, and 37 and 38 in the clutch. The clutch plates 39 and 40 are so formed that when they are clamped to one another (facing one another as shown in FIG. 5) and held by the four machine screws and bolts 41, 42, 43 and 44 to provide the bearing holes 45, 46, 47, and 48; so that the stud shaft 31 rides inside the bearing hole 46, the stud shaft 30 rides within the bearing hole 47, the stud shaft 37 rides within the bearing hole 46, and the short stud shaft 38 rides within the bearing hole 48. It must be understood that while the short stud shafts 31, 32, 37 and 38, are held tight within the bearing holes 29, 30, 35 and 36, they are free to rotate within the holes 35, 46, 47 and 48 formed by the pair of clutch plates 39 and 40. Bearings 45, 46, 47 and 48 are the bearings which need be lubricated when the clutch is in operative positions, being driven by the prime mover (not shown).

The lubricant grease is delivered to the flexible clutch from its reservoir 13 in the following manner. There is a flexible tubing "T" provided which by means of appropriate piping connections "P" connects the reservoir 13 to a lubrication source (a tank not shown). The grease from the piping "T" and the piping connections "P" by means of the threaded extension "E" is delivered into the space 17 which is formed by the rotating disk member 20 in the stationary reservoir 13 (better see in FIG. 2). A vertical hole 49 which leads into the rotating disk member 20 is provided connecting with the horizontal hole 50, substantially as shown. A threaded stud "S" by means of the threaded portion 51 connects with the disk member 20. A small L-shaped piece of piping "L" leading from the threaded stud "S" has its other end, by means of the piping connection "N", is secured to the short stud shaft 37 by its threaded portion 52. There is also provided a connecting hole 53 in the stud 37 which the lubricant may enter and pass into the space provided between the two pair of clutch plates 39 and 40, so as to form the grease well "W" (Shown better in FIG. 4). With the lubricating grease now housed in the well "W" the lubricant can be freely delivered to the bearings 45, 46, 47 and 48 to lubricate the short stud shafts. By following the flow of the lubricant indicated by the arrow (A) one can discern that even though the clutch is in operative position, being rotated by a prime mover, it is possible to deliver freely lubricant grease from a reservoir to the rotating clutch.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed. Minorchanges in shape, size and materials, and rearrangement of parts, may be resorted to in actual practice, as long as no departure is made from the invention claimed.

Having described my invention, what I claim is the following:

1. In a device of the class described to deliver lubricant grease to a flexible clutch having a drive and a driven shaft, comprising, in combination, a reservoir to which lubricant is delivered and from which the lubricant is sent to the clutch, said reservoir having a circular space with a circular disk member snuggly fitting therein, the outer diameter of said disk being smaller than the diameter of said space in said reservoir, the difference between said diameters forming a clear room into which lubricant may collect to be fed to said clutch; one side of said disk being held to said flexible clutch with its drive shaft, with the other side being held to the driven shaft, said clutch being formed of two forked U-shaped members held to one another by means of stud shafts, and means for supplying lubricant grease to said stud shafts to prevent friction, said means delivering said lubricant from said stationary reservoir to said clutch being driven by said drive shaft to drive the driven shaft aforesaid.

2. The combination according to claim 1; said means for delivering said lubricant comprising a piping connecting said circular disk member to the clutch, the stud shafts four in number being held by means of a pair of plates in four bearings, with each stud shaft snuggly fitting into said bearings, said piping connecting said circular disk member to said four bearings to supply lubricant to said stud shafts to prevent friction.

3. The combination according to claim 2: and means provided to secure and to hold said pair of plates tight to one another, said means including a number of bolts and nuts, holes in said plates in alignment to receive said bolts and nuts, holes in said plates comprising said bearings, the tightening of said bolts and nuts forming a hollow space within said plates to form a well to receive and to hold lubricating grease for delivery to said stud shafts.

* * * * *